(12) United States Patent
Kuan (10) Patent No.: US 10,733,490 B2
(45) Date of Patent: Aug. 4, 2020

(54) SYSTEM FOR PRODUCT MANAGEMENT AND AUTHENTICATION

(71) Applicant: Hsinyi Kuan, Taipei (TW)

(72) Inventor: Hsinyi Kuan, Taipei (TW)

( * ) Notice: Subject to any disclaimer, the term of this patent is extended or adjusted under 35 U.S.C. 154(b) by 0 days.

(21) Appl. No.: 16/278,587

(22) Filed: Feb. 18, 2019

(65) Prior Publication Data

US 2019/0279061 A1 Sep. 12, 2019

(30) Foreign Application Priority Data

Mar. 7, 2018 (TW) .............................. 107107511 A (51) Int. Cl.
| | |
|---|---|
| *G06Q 30/00* | (2012.01) |
| *G06K 19/06* | (2006.01) |
| *G06F 21/36* | (2013.01) |
| *G06F 16/955* | (2019.01) |

(52) U.S. Cl.
CPC ... *G06K 19/06037* (2013.01); *G06F 16/9554* (2019.01); *G06F 21/36* (2013.01); *G06Q 30/018* (2013.01)

(58) Field of Classification Search
CPC ........................ G06K 19/06037; G06Q 30/018
USPC ........................................................ 235/494
See application file for complete search history.

(56) References Cited

U.S. PATENT DOCUMENTS

| | | | | |
|---|---|---|---|---|
| 2010/0057586 | A1* | 3/2010 | Chow ..................... | G01S 19/14 705/26.1 |
| 2016/0012498 | A1* | 1/2016 | Prasad ............... | G06Q 30/0601 705/26.1 |

* cited by examiner

*Primary Examiner* — Toan C Ly (57) ABSTRACT

A system for product management and authentication of the present invention includes a management platform, a first database and a second database. The first database and the second database are respectively connected with management platform. The management platform includes an input unit, an output unit and an authentication unit. The input unit includes a special identification code and a mobile code. The special identification code provides the network access device to register and login. The users include a vendor and a consumer. The second database receives the product information of the first database for language conversion. The network access device provides a selection from a list of available languages via the mobile code and displays the product information in a selected language. The authentication unit provides an authentication code which provides the network access device to register and login to check the authenticity of the product, and to avoid counterfeit to protect the rights and interests of consumers.

8 Claims, 5 Drawing Sheets

SYSTEM FOR PRODUCT MANAGEMENT AND AUTHENTICATION

BACKGROUND OF THE INVENTION

1. Field of the Invention

The present invention relates generally to a system for product management and authentication and in particular to a system for product management and authentication which enables consumers of different languages to inquire about product information in their familiar languages, and to authenticate the authenticity of the product.

2. Related Art

Products on store shelves are conventionally labeled with lengthy product descriptions in local language. For a consumer who comes from abroad, the first problem facing the consumer is the reading of the product description, for example, (1) the font size of the description words is too small to read; (2) the consumer does not understand the local language; (3) description contents may be arranged disorderly or insufficiently in a vague way. All those make consumers more difficult to select their favorite items and may also reduce their purchasing demands.

The second problem facing the consumer is the ubiquitous counterfeit. A study published on April in 2017 by Organisation for Economic Co-operation and Development (OECD) shows that the global market of counterfeit and pirated goods would be worth 461 billion dollars. More than 60% of the counterfeits come from China and the most seriously counterfeited brand is Nike. Until now, there is no clear solution to the threat of the counterfeits. This problem has significantly affected consumer confidence in certain brands. Furthermore, if the counterfeit is food product, the used inferior raw materials may cause physical illness, or even immediate harm to human health. Further still, if someone's ticket such as Mass Rapid Transit (MRT) ticket or high-speed rail ticket is missing, it may be much more likely to be illegally used by others. To date there's no authentication method to settle this down.

Next, the third problem is that the marketing channels are now still held by search engine or social media such as Google, Facebook, IG, etc.. Because the advertising and impression algorithm of search engine and social media are changed all the time, vendors can hardly be specifically evaluated their marketing and promotion effects. It has not found a way to organize or integrate both offline and online marketing channels.

Therefore, how to solve the problems mentioned above is a worthy question to explore.

SUMMARY OF THE INVENTION

An object of the present invention is to provide a system for product management and authentication wherein a network access device of a user can be used to login a management platform of the system by scanning a mobile code of product in order to select a familiar language to display product information so as to prevent that the font size of the description is too small to read, and solve the consumer's difficulty in reading in an unfamiliar language, and reduce printing costs dramatically, also avoid deficient and disordered product information displayed on vendor stalls or shop shelves.

Another object of the present invention is to provide a system for product management and authentication which provides stored statistical records onto the network access device of registered users (i.e. vendors), which is beneficial for the vendors or shop owners to evaluate ROI of their product advertising and to retarget consumer groups so as to ensure online and offline integrated marketing effect.

Another object of the present invention is to provide a system for product management and authentication which provides at least an authentication code that provides the network access device to register and login in order to check the authenticity of the product, furthermore to avoid counterfeit or being stolen to protect the rights and interests of consumers.

To attain this, a system for product management and authentication of the present invention is wirelessly connected with a network access device of users via a specific web address. The users include at least a vendor and at least a consumer. The system includes a management platform, a first database and a second database. The first database and the second database are respectively connected with management platform. The management platform includes an input unit and an output unit. The input unit includes a special identification code and a mobile code. The special identification code provides the network access device to register and login. After registration, the network access device accesses related product introductions for online interactions. The mobile code provides the network access device to login. After login, the network access device displays product information. The output unit provides the network access device to identify an inputted special identification code. If the inputted special identification code belongs to the vendor, the network access device accesses to an editing interface of product information. If the inputted special identification code belongs to the consumer, the network access device allows transmission and download of the product information. The first database sorts and stores the product information edited by the output unit. The second database is connected with the first database to receive the product information of the first database for language conversion. The second database provides the consumers a selection from a list of available languages and displays the product information on the network access device in a default or selected language.

In accordance with the present invention, the management platform further includes a statistical unit, a transaction unit and a feedback unit. The statistical unit is connected with the first database. The statistical unit includes a microprocessor which sorts and stores records about login and/or registration. The transaction unit is connected with the first database, includes a payment device which sorts and stores records of all login and payment by the input unit. The transaction unit including the payment device provides a price interface and a payment interface. The feedback unit is connected with the transaction unit and the statistical unit. The feedback unit has a protocol interface which provides the records that the transaction unit and the statistical unit calculate, sort and store onto the network access device via the special identification code of the input unit.

In accordance with the present invention, the management platform further includes an authentication unit. The authentication unit is connected with the input unit. The authentication unit provides an authentication code which provides the network access device to register and login in order to check the authenticity of the product.

In accordance with the present invention, the authentication code is an application code. The authentication code is directly provided on the network access device as soon as the mobile code of the input unit is used to login. The authentication code is used to be sensed by certain readers to check the authenticity of the product.

In accordance with the present invention, the authentication code is edited by the output unit after registration and login with the special identification code of the input unit. The authentication code is selected from Universally Unique Identifier (UUID), expired date, channel, location and address.

DESCRIPTION OF THE INVENTION

Figure 1:
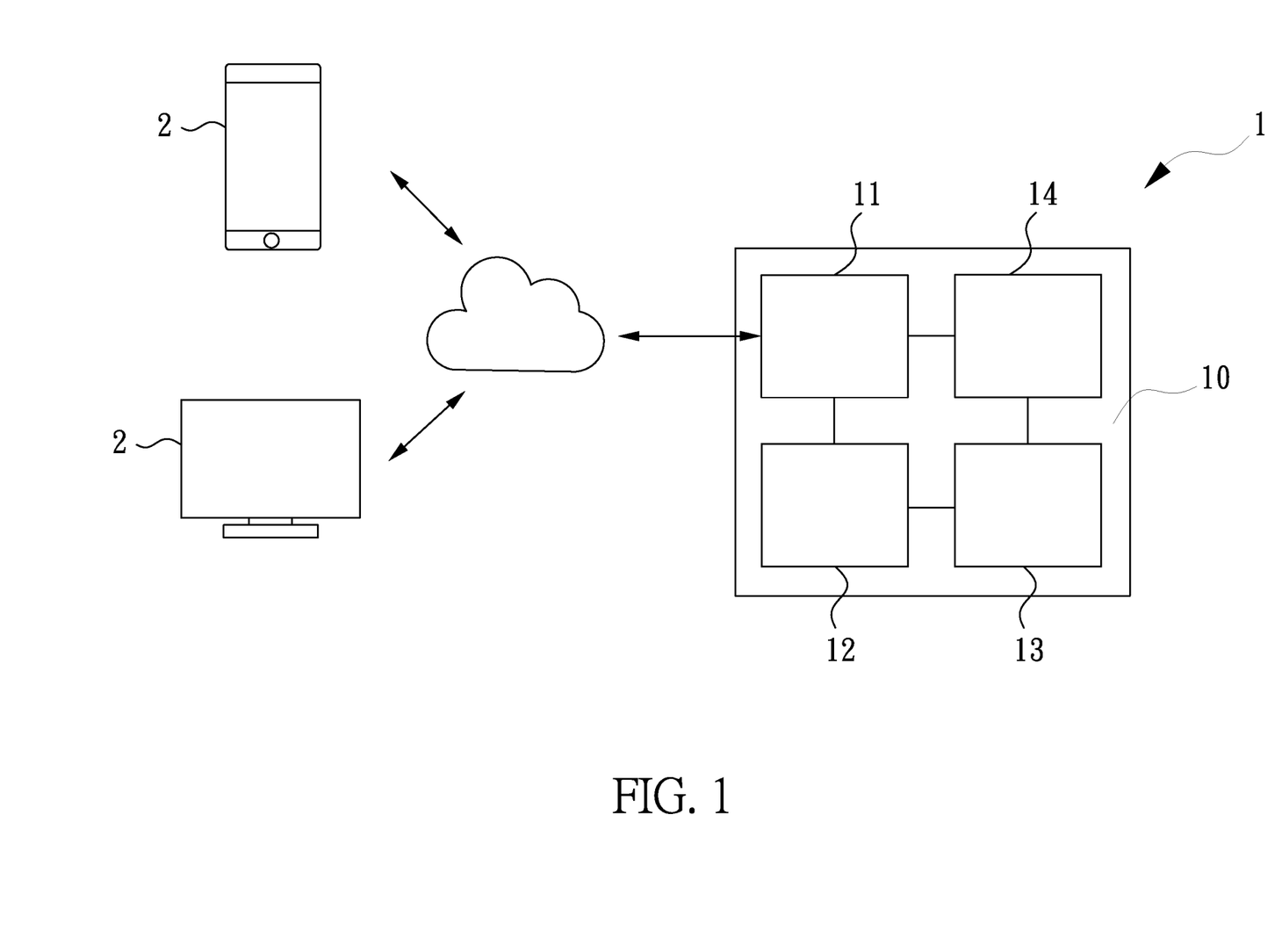
FIG. 1 is a system frame diagram of the system for product management and authentication according to the first embodiment of the present invention.

Referring to FIG. 1, a system for product management and authentication according to a first embodiment of the present invention is provided. The system 1 is provided by a platform developer and is wirelessly connected with a network access device 2 of users via a specific web address. The users include at least a vendor (or shop owner) and at least a consumer. The system 1 includes a management platform 10, a first database 13 and a second database 14. The first database 13 and the second database 14 are respectively connected with management platform 10. The management platform 10 includes an input unit 11 and an output unit 12. The input unit 11 includes a special identification code and a mobile code. The special identification code provides the network access device 2 to register and login. After registration, the network access device 2 accesses to related product introductions for online interactions. The related product introductions, for example, may be marketing campaigns or online interactions via Augmented Reality (AR)/Virtual Reality (VR). The mobile code is a two-dimensional bar code such as QR code. The mobile code provides the network access device 2 to login. After login, the network access device 2 displays product information. The output unit 12 provides the network access device 2 to identify an inputted special identification code. If the inputted special identification code belongs to the vendor, the network access device 2 accesses to an editing interface of product information. If the inputted special identification code belongs to the consumer, the network access device 2 allows transmission and download of the product information. The first database 13 sorts and stores the product information edited by the output unit 12. The product information may be product category, product name, product introduction, manufacturing date, product ingredient, expiry date, raw material provenance, etc.. The product information may be edited and stored in the form of text, picture, symbol, etc.. The second database 14 is connected with the first database 13 to receive the product information of the first database 13 for language conversion. The second database 14 provides the consumers a selection from a list of available languages and displays the product information on the network access device 2 in a selected language. It is noted that the mobile code of the input unit 11 is not limited to the QR code, and may be other kind of two-dimensional bar codes or even one-dimensional bar code.

If Taiwan night market vendors, for example, apply to the system 1 in accordance with the present invention, they can login the input unit 11 of the management platform 10 with the special identification code that has been registered, and utilize the output unit 12 to edit their snack information such as snack name, background, features and raw material provenance in the form of text and picture, and store them all in the first database 13. On the other hand, consumers such as foreign tourists, can login the input unit 11 by scanning a mobile code and then select a familiar language to display the snack information, they thus can easily and rapidly find their favorite snacks to buy. This allows consumers, especially the foreign tourists, to know more about the Taiwan night market snacks, without necessarily reading small introduction words written or printed on snack stalls, or reading them in unfamiliar languages. In other words, for the vendors who used to post introduction words next to their products, they adopting the system 1 in accordance with the present invention can prevent that the font size of the description words is too small to read, and solve the consumer's difficulty in reading in an unfamiliar language, and reduce printing costs dramatically, and avoid deficient and disordered product information displayed on vendor stalls or shop shelves. Besides, the network access device 2 such as smart phone or computer device, also provides a list of available languages for consumer to choose for better understanding about the product. Moreover, after login with a registered special identification code, the vendor or the shop owner can accesses to marketing campaigns or to product introductions via Augmented Reality (AR)/Virtual Reality (VR) for online interactions. Therefore, the consumers who login by scanning a mobile code can browse the contents provided by the vendors or shop owners.

Figure 2:
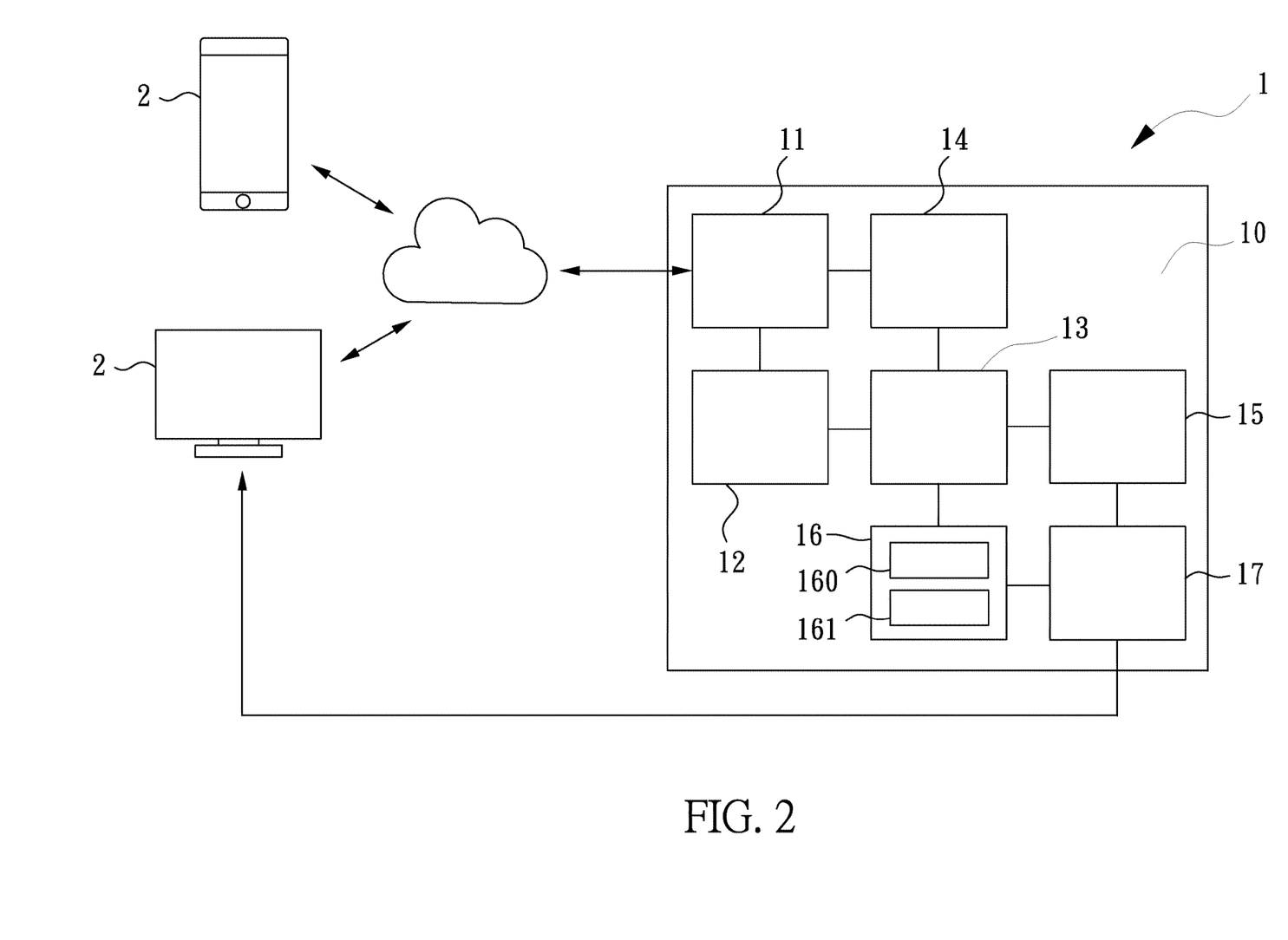
FIG. 2 is a system frame diagram of the system according to the second embodiment of the present invention.

Referring to FIG. 2, a system for product management and authentication according to a second embodiment of the present invention is provided. The system 1 is provided by a platform developer and is wirelessly connected with a network access device 2 of users via a specific web address. The users include at least a vendor and at least a consumer. The system 1 includes a management platform 10, a first database 13 and a second database 14. The first database 13 and the second database 14 are respectively connected with management platform 10. The management platform 10 includes an input unit 11, an output unit 12, a statistical unit 15, a transaction unit 16 and a feedback unit 17. The input unit 11 includes a special identification code and a mobile code. The special identification code provides the network access device 2 to register and login. The mobile code such as a two-dimensional bar code, for example, QR code, to provide the network access device 2 to login. The output unit 12 provides the network access device 2 to identify an inputted special identification code. If the inputted special identification code belongs to the vendor, the network access device 2 accesses to an editing interface of product information. If the inputted special identification code belongs to the consumer, the network access device 2 allows transmission and download of the product information. The statistical unit 15 is connected with the first database 13. The statistical unit 15 includes a microprocessor which sorts and stores records about login and/or registration. The transaction unit 16 is connected with the first database 13. The transaction unit 16 includes a payment device (not shown) which sorts and stores records about login and payment. The transaction unit 16 provides a price interface 160 and a payment interface 161. The feedback unit 17 is connected with the transaction unit 16 and the statistical unit 15. The feedback unit 17 provides a protocol interface which provides the records that the transaction unit 16 and the statistical unit 15 calculate, sort and store onto the network access device 2 via the special identification code of the input unit 11. After registration and login, the network access device 2 accesses to marketing campaigns or to related product introductions for online interactions via Augmented Reality (AR)/Virtual Reality (VR). It is noted that the mobile code of the input unit 11 is not limited to the QR code, and may be other kind of two-dimensional bar codes or even one-dimensional bar code.

If giant retailer Costco, for example, applies to the system 1 in accordance with the present invention, it can register and login the input unit 11 of the management platform 10 with the special identification code that has been registered, and utilize the output unit 12 to edit their product information in the form of text and picture, and then utilize the price interface 160 of the transaction unit 16 to store a variety of product prices in the first database 13. Consumers can use the network access device 2 such as smart phone or computer, to login the input unit 11 by scanning a mobile code and select a familiar language to display the product prices and related activities. Once the consumers decide to buy the product, they can pay online via the payment interface 161 of the transaction unit 16. Further, the statistical unit 15 and the feedback unit 17 connected with the transaction unit 16 can record and calculate a total price of payment for products and provide feedback to Costco e.g. feedback to the network access device 2 of Costco such as smart phone or computer. Therefore, it is beneficial that the vendors or the shop owners to evaluate their product marketing benefits and to retarget consumer groups, so as to ensure online and offline integrated marketing effect.

Figure 3:
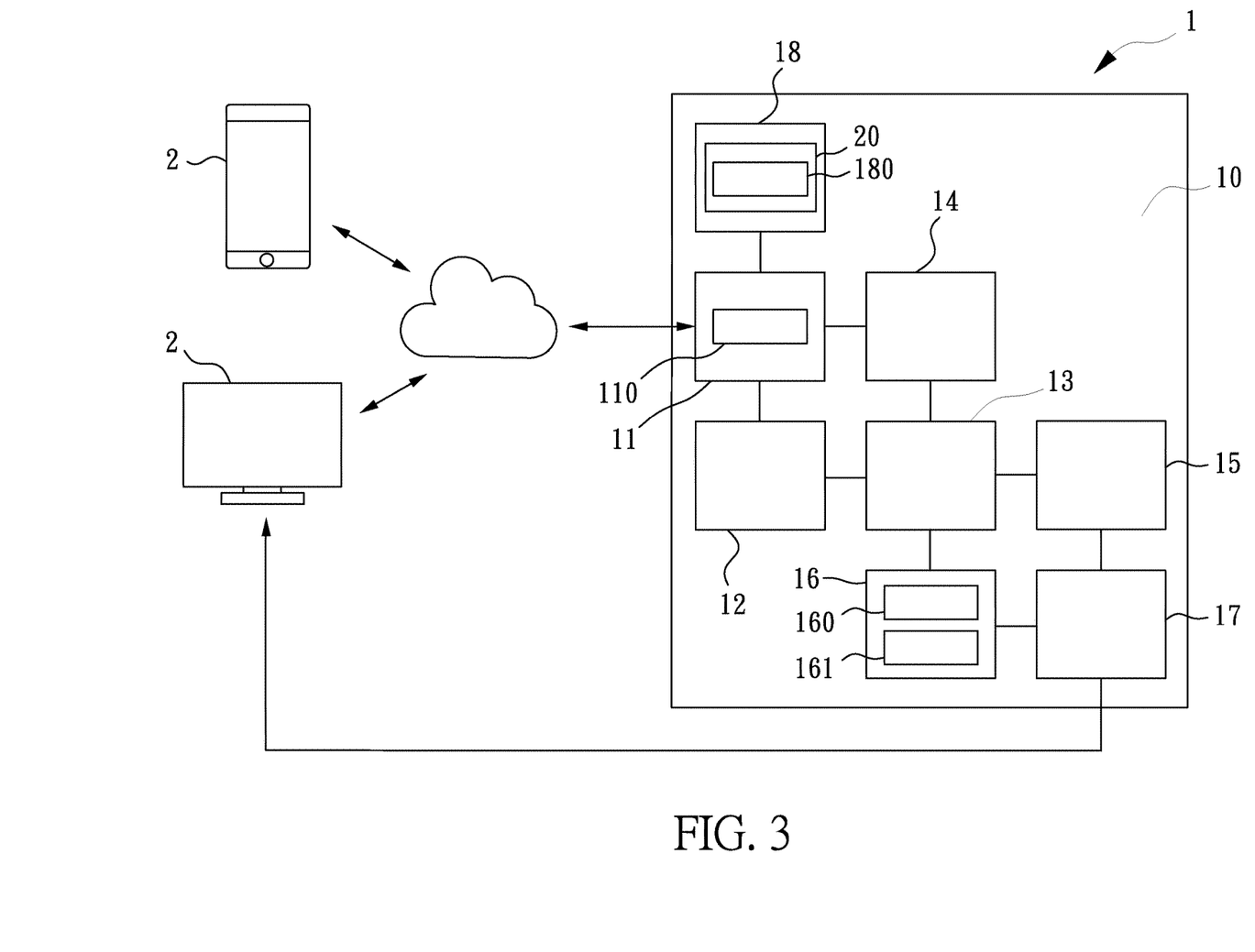
FIG. 3 is a system frame diagram of the system according to the third embodiment of the present invention.
Figure 4:
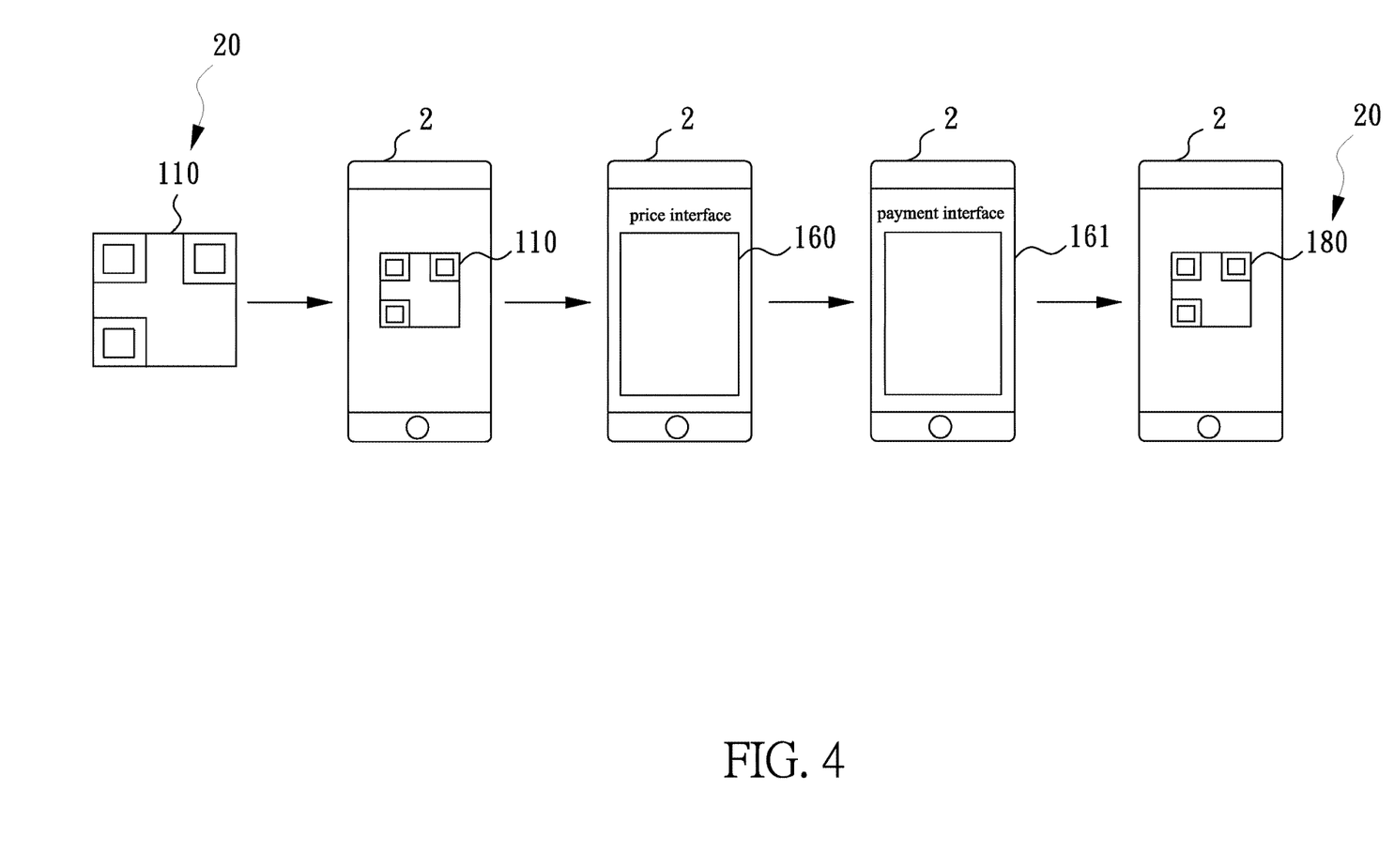
FIG. 4 is a schematic view illustrating the operation of the authentication code according to the third embodiment of the present invention.

Referring to FIG. 3, a system for product management and authentication according to a third embodiment of the present invention is provided. The system 1 is provided by a platform developer and is wirelessly connected with a network access device 2 of users via a specific web address. The users include at least a vendor and at least a consumer. The system 1 includes a management platform 10, a first database 13 and a second database 14. The first database 13 and the second database 14 are respectively connected with management platform 10. The management platform 10 includes an input unit 11, an output unit 12, a statistical unit 15, a transaction unit 16, a feedback unit 17 and an authentication unit 18. The input unit 11 includes a special identification code and a mobile code. The special identification code provides the network access device 2 to register and login. After registration, the network access device 2 accesses to related product introductions for online interactions. The related product introductions, for example, may be marketing campaigns or online interactions via Augmented Reality (AR)/Virtual Reality (VR). The mobile code is a two-dimensional bar code such as QR code. The mobile code provides the network access device 2 to login. After login, the network access device 2 displays product information. The output unit 12 provides the network access device 2 to identify an inputted special identification code. If the inputted special identification code belongs to the vendor, the network access device 2 accesses to an editing interface of product information. If the inputted special identification code belongs to the consumer, the network access device 2 allows transmission and download of the product information. The first database 13 sorts and stores the product information edited by the output unit 12. The product information may be product category, product name, product introduction, manufacturing date, product ingredient, expiry date, raw material provenance, etc.. The product information may be edited and stored in the form of text, picture, symbol, etc.. The second database 14 is connected with the first database 13 to receive the product information of the first database 13 for language conversion. The second database 14 provides the consumers a selection from a list of available languages and displays the product information on the network access device 2 in a selected language. The statistical unit 15 is connected with the first database 13. The statistical unit 15 includes a microprocessor which sorts and stores login and registration records. The transaction unit 16 is connected with the first database 13. The transaction unit 16 includes a payment device (not shown) which sorts and stores records about login and payment. The transaction unit 16 provides a price interface 160 and a payment interface 161. The feedback unit 17 is connected with the transaction unit 16 and the statistical unit 15. The feedback unit 17 provides a protocol interface which provides the records that the transaction unit 16 and the statistical unit 15 calculate, sort and store onto the network access device 2 via the special identification code of the input unit 11. The authentication unit 18 is connected with the input unit 11. The authentication unit 18 provides an authentication code 20 which provides the network access device 2 to register and login in order to check the authenticity of the product. The authentication code 20 is an application code 180 such as two-dimensional bar code, for example, QR code. The authentication code 20 is directly provided on the network access device 2 as soon as the mobile code 110 of the input unit 11 is used to login. The authentication code 20 is different from the mobile code 110 of the input unit 11 and is used to be sensed by certain readers, to check the authenticity of the product as shown in FIG. 4. It is noted that the mobile code 110 of the input unit 11 and the authentication code 20 are not limited to the QR code, and may be other kind of two-dimensional bar codes or even one-dimensional bar code.

If the transportation organization such as high speed rail company, railway administration or passenger transport company, applies to the system 1 in accordance with the present invention, it can register and login the input unit 11 of the management platform 10 with the special identification code that has been registered. After registration and login, the transportation organization utilizes the output unit 12 and the price interface 160 of the transaction unit 16 to edit and store a variety of ticket prices in the first database 13. Consumers can use the network access device 2 such as smart phone or computer, to login the input unit 11 by scanning a mobile code and select a familiar language to display the ticket prices. Once the tickets are selected, they can pay online via the payment interface 161 of the transaction unit 16. The authentication code 20 is directly provided on the network access device 2 to be sensed by certain readers such as readers on the platform entrance of the high-speed rail station or the MRT station, or readers on a passenger car like bus, so as to check the authenticity of the tickets, and avoid the ticket counterfeit or the use of illegally obtained ticket.

Figure 5:
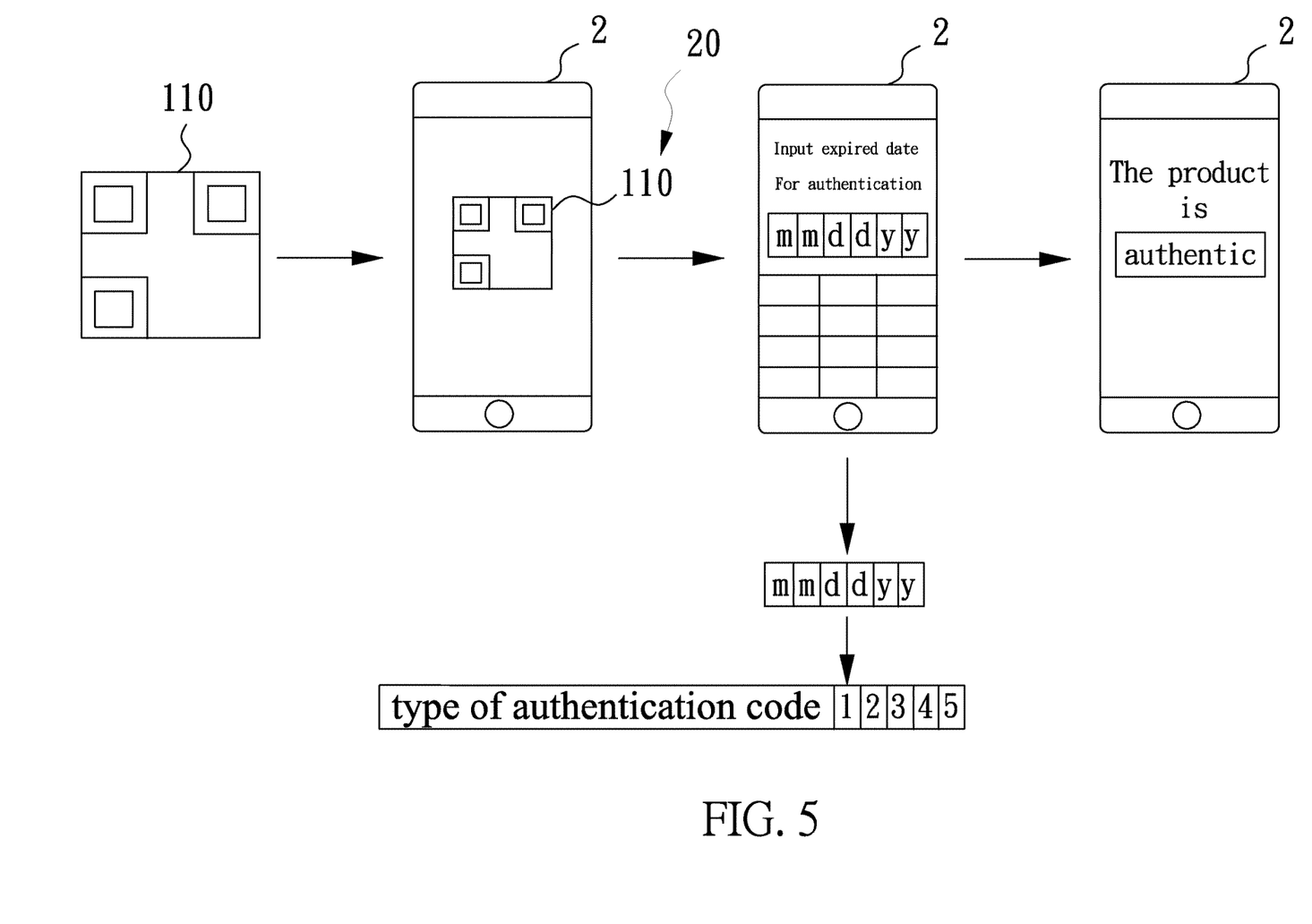
FIG. 5 is a schematic view illustrating the operation of the authentication code according to the fourth embodiment of the present invention.

Referring to FIG. 3 and FIG. 5, a system for product management and authentication according to a fourth embodiment of the present invention is provided. Similarly to the first embodiment, the system 1 in this embodiment is wirelessly connected with a network access device 2 of users via a specific web address. The users include at least a vendor and at least a consumer. The system 1 also includes a management platform 10, an input unit 11, an output unit 12, a first database 13, a second database 14, a statistical unit 15, a transaction unit 16, a feedback unit 17 and an authentication unit 18. The difference between the previous embodiment and this embodiment is that the authentication code 20 of the authentication unit 18 of this embodiment is edited by the output unit 12 after registration and login with the special identification code of the input unit 11. The authentication code 20 may be a Universally Unique Identifier (UUID), expired date, channel, location, address, and so on.

Hence, if the vendors apply to the system 1 in accordance with the present invention, they can access to related product introductions for online interactions after registration and login with the special identification code of the input unit 11. For example, after registration and login, they can access to marketing campaigns or online interactions via Augmented Reality (AR)/Virtual Reality (VR). The authentication code 20 of the product is edited according to the expired date of the product by the output unit 12 and stored in the first database 13. Consumers can login the input unit 11 via the network access device 2 such as smart phone or computer by scanning a mobile code 110. After login, consumers input a corresponding authentication code, i.e. a correct expired date of the product, as shown in FIG. 5, so as to be able to check the authenticity of the product. The authentication code 20 is not limited to the expired date, and may be set by product categories. The authentication code 20 may be a Universally Unique Identifier (UUID), channel, location, address, and so on, so as to provide different degrees of verification in order to protect the rights and interests of consumers.

It is understood that the invention may be embodied in other forms within the scope of the claims. Thus the present examples and embodiments are to be considered in all respects as illustrative, and not restrictive, of the invention defined by the claims.

What is claimed is:

1. A system for product management and authentication, wirelessly connected with a network access device of users via a specific web address, the users including at least a vendor and at least a consumer, the system including a management platform, a first database and a second database, the first database and the second database respectively connected with management platform, wherein:

the management platform includes an input unit, an output unit and an authentication unit, the input unit including a special identification code and a mobile code, the special identification code providing the network access device to register and login, after registration, the network access device accessing to related product introductions for online interactions, the mobile code providing the network access device to login, after login, the network access device displaying product information, the output unit providing the network access device to identify an inputted special identification code, if the inputted special identification code belonging to the vendor, the network access device accessing to an editing interface of product information, if the inputted special identification code belonging to the consumer, the network access device allowing transmission and download of the product information, the authentication unit being connected with the input unit, the authentication unit providing an authentication code which provides the network access device to register and login in order to check the authenticity of the product;

the first database sorts and stores the product information edited by the output unit;

the second database is connected with the first database to receive the product information of the first database for language conversion, the second database providing the consumers a selection from a list of available languages and displaying the product information on the network access device in a selected language; and wherein:

the authentication code is an application code, which is directly provided on the network access device as soon as the mobile code of the input unit being used to login, the authentication code being used to be sensed by certain readers to check the authenticity of the product.

2. The system of claim 1, wherein the application code is a QR code.

3. The system of claim 1, wherein the authentication code is edited by the output unit after registration and login with the special identification code of the input unit, the authentication code is selected from Universally Unique Identifier (UUID), expired date, channel, location and address.

4. The system of claim 1, wherein the management platform further includes a statistical unit, a transaction unit and a feedback unit, the statistical unit is connected with the first database, the statistical unit includes a microprocessor which sorts and stores records about login and/or registration, the transaction unit is connected with the first database, the transaction unit includes a payment device which sorts and stores records about login and payment, the transaction unit provides a price interface and a payment interface, the feedback unit is connected with the transaction unit and the statistical unit, the feedback unit provides a protocol interface which provides the records that the transaction unit and the statistical unit calculate, sort and store onto the network access device via the special identification code of the input unit.

5. The system of claim 4, wherein the records include browsing frequency, registered shop owners and vendors, public and private firms, and categories, names and prices of browsed and sold products.

6. The system of claim 1, wherein the product information stored in the first database in the form of text, picture, symbol, and so on, includes product category, product name, product introduction, manufacturing date, product ingredient, expiry date, raw material provenance, and so on.

7. The system of claim 1, wherein the mobile code of the input unit is a two-dimensional bar code such as a QR code.

8. A system for product management and authentication, wirelessly connected with a network access device of users via a specific web address, the users including at least a vendor and at least a consumer, the system including a management platform, a first database and a second database, the first database and the second database respectively connected with management platform, wherein:

the management platform includes an input unit and an output unit, the input unit including a special identification code, the special identification code providing the network access device to register and login, after registration, the network access device accessing to related product introductions for online interactions, the output unit providing the network access device to identify an inputted special identification code, if the inputted special identification code belonging to the vendor, the network access device accessing to an editing interface of product information, if the inputted special identification code belonging to the consumer, the network access device allowing transmission and download of the product information;

the first database sorts and stores the product information edited by the output unit;

the second database is connected with the first database to receive the product information of the first database for language conversion, the second database providing the consumers a selection from a list of available languages and displaying the product information on the network access device in a selected language.

\* \* \* \* \*